United States Patent [19]

Malone

[11] Patent Number: 5,115,848
[45] Date of Patent: May 26, 1992

[54] PROTECTIVE MIRROR COVER, AND METHODS OF CONSTRUCTING AND UTILIZING SAME

[76] Inventor: Jimmie L. Malone, 8310 Centrae, Detroit, Mich. 48204

[21] Appl. No.: 694,509

[22] Filed: May 2, 1991

[51] Int. Cl.⁵ .................. B65D 65/08; B60S 11/00
[52] U.S. Cl. .................. 150/166; 160/370.2; 296/95.1; 359/511
[58] Field of Search .................. 150/166; 160/370.2; 296/95.1; 350/582, 587, 590

[56] References Cited

U.S. PATENT DOCUMENTS

| | | |
|---|---|---|
| 663,306 | 12/1900 | Tompkins . |
| 2,821,248 | 1/1958 | Irvine .................. 296/95.1 X |
| 2,849,012 | 8/1958 | Cohen et al. .................. 296/95.1 |
| 2,983,298 | 5/1961 | Grothe . |
| 3,046,048 | 7/1962 | Cheney .................. 296/95.1 |
| 3,263,736 | 8/1966 | Macomson .................. 296/95.1 X |
| 3,391,724 | 7/1968 | Charlesworth .................. 296/95.1 X |
| 3,763,908 | 10/1973 | Norman .................. 150/166 |
| 4,049,036 | 9/1970 | Gebhartt .................. 150/168 |
| 4,209,197 | 6/1980 | Fischer . |
| 4,406,320 | 9/1983 | Bingham .................. 160/370.2 |
| 4,635,993 | 1/1987 | Hooper et al. .................. 296/95.1 |
| 4,834,157 | 5/1989 | Smith . |
| 4,867,216 | 9/1989 | McKee .................. 150/166 |

FOREIGN PATENT DOCUMENTS

| | | | |
|---|---|---|---|
| 493935 | 7/1976 | Australia .................. 296/95.1 |
| 73216 | 9/1960 | France .................. 296/95.1 |
| 1332703 | 6/1963 | France .................. 296/95.1 |
| 1424528 | 12/1965 | France .................. 296/95.1 |
| 2540798 | 8/1984 | France .................. 296/95.1 |

*Primary Examiner*—Sue A. Weaver
*Attorney, Agent, or Firm*—Irving M. Weiner; Robert M. Petrik; Joseph P. Carrier

[57] ABSTRACT

A system for protecting the exposed glass surfaces of a vehicle including external mirror covers and window covers. The mirror covers comprise bag-like enclosures of weather resistant material which totally enclose the mirror preventing the formation of ice, frost or snow buildup. The window covers comprise sheets of flexible material having fasteners at the perimeter for securing the cover adjacent the outer side of the window. The fasteners include magnets and hooks.

8 Claims, 2 Drawing Sheets

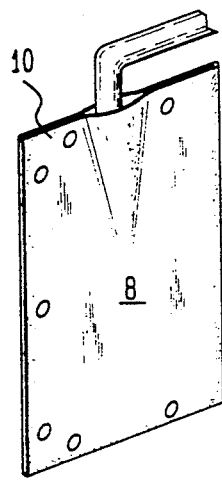 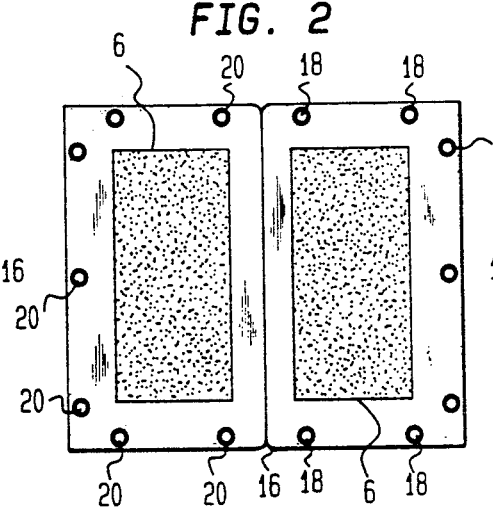 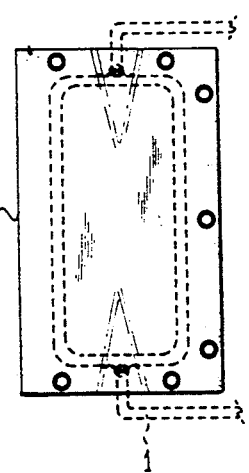
FIG. 1  FIG. 2  FIG. 3
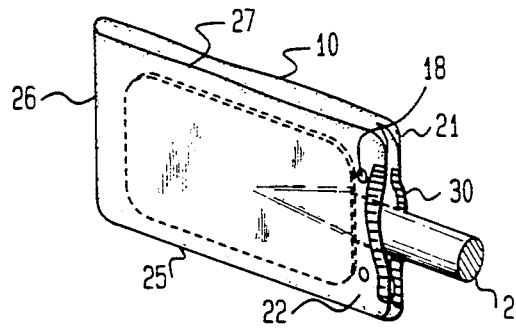 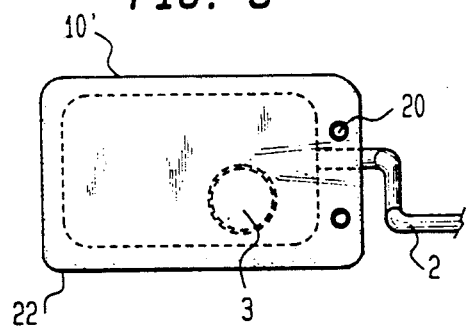
FIG. 4  FIG. 5
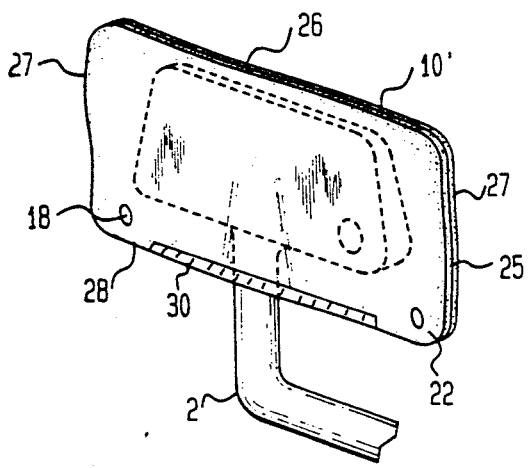 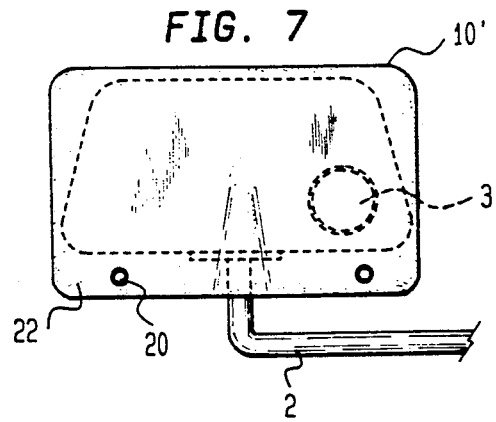
FIG. 6  FIG. 7

PROTECTIVE MIRROR COVER, AND METHODS OF CONSTRUCTING AND UTILIZING SAME

BACKGROUND OF THE INVENTION

1. Field of the Invention

The present invention relates to a system for protecting the exposed glass surfaces of a vehicle, including the external rear view mirrors. More particularly cover means are provided over these surfaces to prevent the formation of ice or frost and to ease the removal of snow and/or other debris.

2. Description of the Relevant Art

Prior to the present system, there have been other methods for protecting the outer surfaces of vehicles.

U.S. Pat. No. 4,834,157 discloses cover of flexible material adapted to cover the outer surface of a rear view mirror. However, the cover is adapted to protect the outer surface of the mirror support with the mirror left unprotected.

U.S. Pat. No. 4,209,197 discloses a flexible cover for the windshield and side windows of a vehicle to aid in the removal of snow and ice. The cover extends over the roof of the vehicle and may be mounted by using flexible magnets.

U.S. Pat. No. 633,306 discloses a cover for a lamp comprising a bag like member having means to close an open end. However, elastic or mating members are not disclosed for closing the open end of the cover.

U.S. Pat. No. 2,983,298 discloses the use of elastic margins for water impervious covers, such as boat covers.

The present invention differs from the prior art by providing window cover means and rear view mirror cover means as a system for protecting these surfaces.

SUMMARY OF THE INVENTION

According to the present invention, there is disclosed a system for protecting exposed glass surfaces comprising window cover means and cover means for externally mounted rear view mirrors. The window cover means comprises a flexible sheet of material sized to be slightly larger than the auto window which is to be protected with securement means provided at the perimeter of said sheet. The cover means for rear view mirrors comprises a pocket-like or bag-like device adapted to close around the mirror with an opening for the mirror support stem.

It is an object of the present invention to provide protective covers to prevent the formation of ice on vehicle glass surfaces.

It is a further feature of the present invention to provide covers which are easily applied and removed.

It is a further object of the present invention to provide flexible covers which are weather resistant.

The above and further objects, details and advantages of the invention will become apparent from the following detailed description, when read in conjunction with the accompanying drawings.

BRIEF DESCRIPTION OF THE DRAWINGS

FIG. 1 illustrates a first embodiment of an exterior mirror cover in accordance with the present invention.

FIG. 2 illustrates the cover of FIG. 1 in an open position.

FIG. 3 illustrates the cover of FIG. 1 when applied to a first type of exterior rear view mirror.

FIG. 4 illustrates a second embodiment of an exterior mirror cover on a second type of exterior mirror in accordance with the present invention.

FIG. 5 illustrates the cover of FIG. 4 on a third type of exterior rear view mirror.

FIG. 6 illustrates a third embodiment of an exterior mirror cover on a fourth type of exterior mirror in accordance with the present invention.

FIG. 7 illustrates the cover of FIG. 6 on a fifth type of exterior rear view mirror.

DETAILED DESCRIPTION OF THE PREFERRED EMBODIMENT

Figure 8:
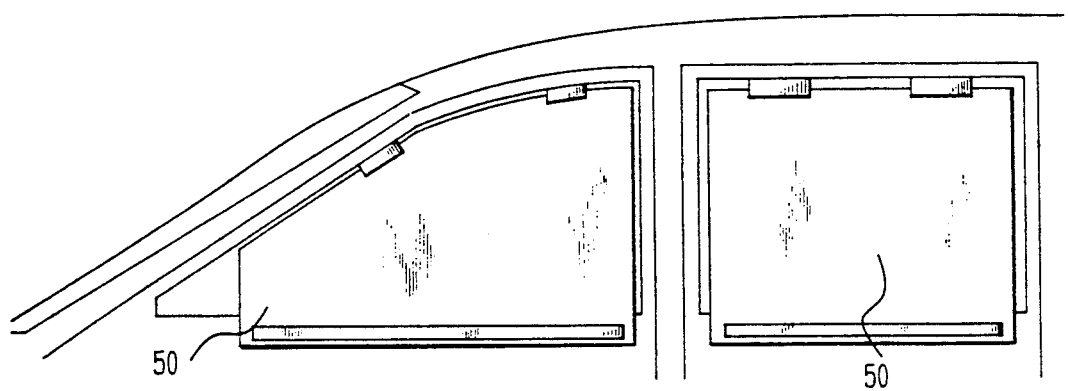
FIG. 8 illustrates the window covers on an automobile in accordance with the present invention.

Referring now to the drawings, and more particularly to FIG. 1, the exterior cover means 10 of the system of the present invention is shown. The cover means 10 generally comprises of two sheets of flexible material 12, 14 permanently joined along at least one side 16 which acts as a hinge. This type of cover is utilized when the mirror 1 is of the type having two support items. Each sheet 12, 14 has secured thereto mating fastening means 18, 20 such that the cover 10 surrounds the mirror 1 when the fastening means are mated about the mirror 1. The cover 10 is sized to cover the mirror and includes a soft, non-abrasive inner surface 6 and a substantially weather-resistant outer surface 8. Cover means 10 may also be composed of a large sheet folded in half and having fastening means 18, 20 comprising snap fasteners provided thereon.

As shown in FIGS. 4–7, a second embodiment of the exterior mirror cover means 10' is utilized to protect mirror 2 of the type having a single support stem. The bag-like cover 10' is constructed of two sheets of materials 21, 22 permanently fastened together around three sides, first side 25, second side 26, third side 27 with the fourth side 28 remaining open. The open side or fourth side 28 includes mating fastening means 18, 20 which act to secure the cover 10' to the mirror 2. A central portion of the open side 28 preferably includes an elastic closure 30 to substantially close around the support stem of mirror 2. This feature provides the mirror the greatest weather protection possible. The cover 10' also permits coverage of mirrors including the "wide angle" type mirror 3 which comprises a secondary mirror which budges outwardly from the mirror face.

Figure 9:
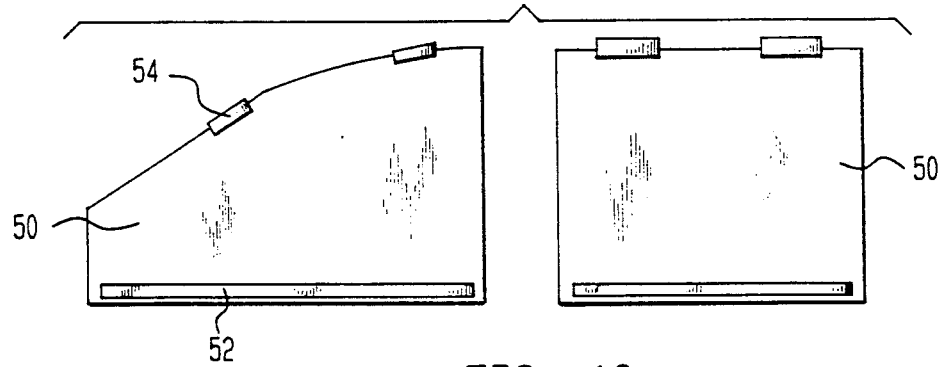
FIG. 9 illustrates the window covers in accordance with the present invention.
Figure 10:
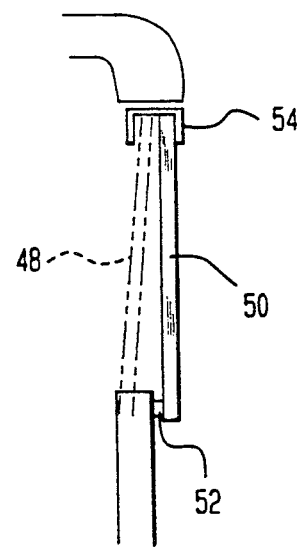
FIG. 10 illustrates the method for securing the window covers of FIG. 9.

Referring now to FIGS. 8–10, the window cover means 50 of the present invention is shown. The cover means 50 comprises a flexible sheet affixed to the vehicle to cover the window 48. The cover means 50 is shaped to generally conform to the shape of the window. The cover means 50 includes securement means 52, 54 about the perimeter thereof. The securement means may comprise book member 54 as best seen in FIG. 10 and magnetic strips 52. The magnetic strips 52 are of the type which are not harmful to the finish of the vehicle. The hook members 54 may be strips of material capable of being clamped by the window 48.

Although there has been described what is at present considered to be preferred embodiment of the invention, it will be understood that various modifications and variations may be made therein, and it is intended to cover in the appended claims all such modifications as fall within the true spirit and scope of the invention.

I claim:

1. A system for protecting exposed glass surfaces of a vehicle comprising:
   a cover means for at least one external rearview mirror having at least one external support arm comprising a bag-like flexible cover adapted to fit over the free end of said external mirror and having a closed end, an open end and opposed side members, said open end having elastic means adapted to close said opposed side members around the support arm of said external mirror; and
   a plurality of window cover means having means for securing said window cover means to a vehicle.

2. The system of claim 1, wherein:
   said open end having means for fastening said open end in a closed position such that said opposed side members surround the support arm of said external mirror.

3. The system of claim 2, wherein:
   said window cover means comprises a flexible flat sheet of material having said securement means at the perimeter thereof.

4. The system of claim 3, wherein:
   said securement means comprises magnetic portions attachable to a metallic portion of said vehicle.

5. The system of claim 4, wherein:
   said securement means further includes hook members adapted to engage the window edge.

6. The system of claim 5, wherein:
   said means for fastening said open end comprises opposed mating members on said opposed side members.

7. The system of claim 5, wherein:
   said means for fastening said open end comprises snap members on said opposed side members.

8. The system of claim 5, wherein:
   said opposed side members having a substantially soft, non-abrasive inner surface adapted to be placed adjacent said mirror; and
   said opposed side members having a substantially weather-resistant outer surface.

* * * * *

UNITED STATES PATENT AND TRADEMARK OFFICE
CERTIFICATE OF CORRECTION

PATENT NO. : 5,115,848
DATED : May 26, 1992
INVENTOR(S) : Jimmie L. Malone

It is certified that error appears in the above-identified patent and that said Letters Patent is hereby corrected as shown below:

Column 2, line 52, change "budges" to -- bulges --.
Column 2, line 60, change "book" to -- hook --.

Signed and Sealed this

Sixth Day of July, 1993

Attest:

MICHAEL K. KIRK

Attesting Officer    Acting Commissioner of Patents and Trademarks